(12) United States Patent
Kamps

(10) Patent No.: US 6,238,632 B1
(45) Date of Patent: May 29, 2001

(54) PROCESS AND COMPOSITION FOR REMOVING PRECIOUS METALS FROM ACTIVATED CARBON

(75) Inventor: Martin Lee Kamps, Elko, NV (US)

(73) Assignee: Ashland, Inc., Covington, KY (US)

( * ) Notice: Subject to any disclaimer, the term of this patent is extended or adjusted under 35 U.S.C. 154(b) by 0 days.

(21) Appl. No.: 09/457,592

(22) Filed: Dec. 9, 1999

(51) Int. Cl.[7] .......................... B01D 15/00; C22B 11/00; C22B 11/08; C09K 3/00

(52) U.S. Cl. ........................... 423/25; 423/22; 423/29; 252/184

(58) Field of Search .................. 423/25, 29, 30, 423/31, 22; 252/184

(56) References Cited

U.S. PATENT DOCUMENTS

| | | | |
|---|---|---|---|
| 2,478,652 | * 8/1949 | Byler et al. | 423/25 |
| 3,920,403 | * 11/1975 | Ross | 423/29 |
| 3,935,006 | * 1/1976 | Fischer | 423/25 |
| 3,970,737 | * 7/1976 | Davidson | 423/27 |
| 4,208,378 | * 6/1980 | Heinen et al. | 423/25 |
| 5,176,886 | * 1/1993 | Darnall et al. | 423/29 |
| 5,213,678 | * 5/1993 | Rondum et al. | 208/48 AA |
| 5,427,606 | * 6/1995 | Sceresini | 423/29 |
| 5,769,925 | * 6/1998 | Harvey et al. | 423/29 |

* cited by examiner

Primary Examiner—Steven Bos
(74) Attorney, Agent, or Firm—Connolly Bove Lodge & Hutz

(57) ABSTRACT

A process for removing precious metals from activated carbon. The activated carbon is contacted with an aqueous solution of methyl ethyl ketoxime and sodium hydroxide.

16 Claims, No Drawings

US 6,238,632 B1

PROCESS AND COMPOSITION FOR REMOVING PRECIOUS METALS FROM ACTIVATED CARBON

FIELD OF THE INVENTION

The invention relates to methods and compositions for removing precious metals, such as gold, from activated carbon.

BACKGROUND OF THE INVENTION

As their common name implies, precious metals have great value. Precious metals have a large number of uses in a wide range of products. For example, gold is used in electronics as well as jewelry.

As a result of the substantial value of precious metals, they are widely sought after. Also, in processes involving precious metals, such as deposition on electronic structures, methods are employed to maximize their efficient use and reduce as much as possible the waste of precious metals. In view of the value of precious metals, materials and methods have been developed to be employed to optimize the removal of precious metals from precious metal-containing ore. Similarly, to help reduce waste, processes have also been developed to help ensure maximum removal of precious metals not utilized in any process.

In one example of a process for obtaining precious metals, activated carbon is utilized. For example, activated carbon may be utilized in extracting gold from gold-containing ore. Gold, which may be associated with one or more other materials, may be taken up by activated carbon. The gold must then be disassociated from the activated carbon.

SUMMARY OF THE INVENTION

To address the desire to increase precious metals in the context of a process that includes activated carbon for removing the precious metals, the present invention concerns a process for removing precious metals from activated carbon. According to the process, activated carbon containing precious metals is contacted with an aqueous solution of methyl ethyl ketoxime and sodium hydroxide.

According to one particular embodiment, the present invention provides a process for recovering gold. The process includes removing gold from gold-containing ore to a sodium cyanide solution. The gold and sodium cyanide solution is contacted with activated carbon. Then, the gold laden activated carbon is contacted with an aqueous solution of methyl ethyl ketoxime and sodium hydroxide.

The present invention also relates to a solution. The solution includes methyl ethyl ketoxime and sodium hydroxide.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

DETAILED DESCRIPTION OF THE INVENTION

As stated above, activated carbon may be utilized in obtaining precious metals. As utilized herein, "obtaining" can include originally extracting precious metals from ore containing the precious metals, as well as recovering precious metals from processes involved in utilizing precious metals, such as electroplating. Activated carbon, which is derived from coconut shell, could be used in one portion of a process to obtain the precious metals from ore that includes the precious metals, for example. Extruded carbon could also be utilized in this process. Extruded carbon is activated carbon that has been gone through a molding process. The structure is substantially the same as the coconut shell fragments only pressed or man made. According to another example, activated carbon could be utilized to recover precious metals from a plating bath. Activated carbon may also have other uses for obtaining precious metals.

According to the particular process described above for extracting gold from gold-containing ore, pulverized ore is washed with a solution that includes sodium cyanide. Once in contact with the sodium cyanide, the gold will complex with the cyanide. While the sodium cyanide solution will help to extract gold from the raw ore, the gold must then be disassociate from the sodium cyanide.

To facilitate breakup of the gold and cyanide complex, the gold-cyanide complex may be contacted with activated carbon. The activated carbon acts as a sort of sponge, collecting the gold-cyanide complex, which is in solution. The activated carbon will continue to take up the gold-cyanide complex until a large portion or substantially all of the active sites on the activated carbon have been taken up, the gold "loading" of the activated carbon slows down. At this point, the gold needs to be separated from the activated carbon and cyanide.

To remove gold or other precious metals from activated carbon, the activated carbon with attached precious metals may be subjected to a hot caustic wash or strip at a temperature of about 200° F. to about 325° F. Sodium cyanide may be utilized in the wash. Typically, the caustic solution utilized includes about 1% to about 3% NaOH and has a pH of about 12.5. Such a wash is particularly useful when the precious metal is gold.

The wash removes the precious metal(s) from the activated carbon to the solution used in the wash. The precious metal laden solution may be referred to as "pregnant" solution. After removing the precious metal(s) from the activated carbon, the solution may be cooled below a flash point of the solution. The cooled solution may be passed through plating cells for removing the precious metal(s) from the solution through electroplating. Such cells are often referred to as "e-cells".

According to a typical example of the above-described process, the activated carbon is processed in batches. Each batch involves the processing of about 8 to about 12 tons of precious metal laden, or loaded, activated carbon. In the case where the precious metal is gold, the activated carbon typically includes about 150 to about 350 ounces of gold per ton of activated carbon.

Prior to the hot wash or strip, the activated carbon may be subjected to a rinse process. The rinse process may be carried out with an acidic solution. Along these lines, the solution typically has a pH of about 4 to about 6 Typically, hydrochloric acid or nitric acid is utilized, although any suitable acid may be employed. The rinse may be employed to remove carbonates from the activated carbon. The rinse may also remove base metals.

In the event that a rinse, and particularly an acidic rinse, is utilized, the activated carbon may again be rinsed prior to precious metal removal. In the case of utilization of an acidic rinse, the additional rinse typically is carried out with fresh water. The fresh water may neutralize the acid that may have been previously used to rinse the activated carbon.

After any pre-rinses as described above, the activated carbon may be rinsed to separate the precious metal(s) from the activated carbon. According to typical examples, the rinse is carried out with a caustic solution. According to one example, a sodium hydroxide solution is utilized. Typically, such a solution includes about 1% to about 2% sodium hydroxide.

While the time that the precious metal removing rinse is carried out may vary, typically, the rinse takes place over a time period of about 8 hours to about 20 hours. In the rinse, temperature may affect the strip rate. Along these lines, higher temperatures typically increase strip rate. Another fresh water rinse may be carried out after the caustic rinse. The fresh water rinse may be carried out for about 20 minutes to about 30 minutes. The caustic and also the possible subsequent fresh water solution include the precious metal(s).

After removal of the precious metal(s), the activated carbon may be treated for reuse. According to one process, the activated carbon may be regenerated by heating. The heating may be carried out to any suitable temperature. For example, the activated carbon may be heated to a temperature of about 750° F. to about 1100° F. prior to being reused in the precious metal(s) recovery process.

As can be appreciated from the above example, separating the precious metal(s) from the activated carbon requires a great deal of time. The present invention is directed to a process and composition that can reduce the time required to remove the precious metal(s) from the activated carbon. The present invention can also increase the production of precious metal(s) in a given time period.

By decreasing the time, the present invention can increase the amount of activated carbon treated and, hence, the amount of precious metal(s) recovered. Increasing the amount of precious metal(s) recovered from activated carbon can increase profitability of an operation. Other benefits of the process according to the present invention include utilization of less energy to heat the strip solution as a result of the decreased time required to recover the precious metal(s). Less heat translates into less cost, among other things.

The present invention utilizes an oxime having the following formula in the process of removing precious metal(s) from activated carbon during the removal, or elution or strip, stage.

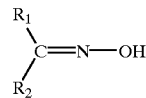

wherein $R_1$ and $R_2$ may be the same or different and are selected from hydrogen, lower alkyl groups of 1–8 carbon atoms and aryl groups, and mixtures thereof. The invention typically utilizes aliphatic oximes. In particular, the present invention utilizes methyl ethyl ketoxime, also commonly known as MEKOR or MEKOR 70.

Information about oximes and MEKOR may be found in U.S. Pat. No. 4,487,745, to Emerich et al., issued Dec. 11, 1984; U.S. Pat. No. 5,648,305, to Mansfield et al., issued Jul. 15, 1997, and U.S. Pat. No. 5,552,036, to Foret et al., issued Sep. 3, 1996, the entire contents of all of which is hereby incorporated by reference. Adding MEKOR, or another oxime of the above formula, to the strip solution can enhance the rate and/or quantity of precious metal(s) recovery. As a result, the present invention can save money, time, and increase production and profitability.

The present invention has been found to be particularly useful in the recovery of gold from activated carbon utilized in processes of recovering gold from gold-containing ore. However, the process and composition of the present invention may have uses in recovering other precious metals in the same and/or in other contexts.

According to the present invention, MEKOR is included in the above-described process for extracting precious metal (s) from activated carbon. The MEKOR is added to the hot caustic wash. One of ordinary skill in the art could also determine other effective oximes of the above formula without undue experimentation once aware of the disclosure contained herein. MEKOR provides benefits over another strip enhancer, hydrazine due to the danger associated with handling hydrazine.

According to the present invention, the hot caustic wash is carried out with an aqueous solution that includes sodium hydroxide as the caustic agent. Other caustic compounds could also be utilized. According to one example, sodium benzoate is utilized.

Typically, if the sodium hydroxide is employed, the hot caustic wash is carried out with a solution that includes about 1.0% to about 2.0% sodium hydroxide. One particular embodiment includes about 1.0% sodium hydroxide. However, any effective concentration of sodium hydroxide may be utilized. One of ordinary skill in the art would be able to determine an effective concentration of sodium hydroxide or other caustic or other type of agent without undue experimentation once aware of the disclosure contained herein.

The solution also includes about 0.25% to about 2.0% MEKOR. Typically, the amount of MEKOR may vary from about 0.5% to about 1.0%. One particular embodiment includes about 1.0% MEKOR.

However, any effective concentration of MEKOR may be utilized. One of ordinary skill in the art would be able to determine an effective concentration of MEKOR without undue experimentation once aware of the disclosure contained herein.

As the description implies, the hot caustic wash is carried out at temperatures above room temperature. According to one example, the hot caustic wash is carried out at a temperature of about 80° C. to about 100° C. Typically, the temperature is from about 90° C. to about 100° C. On embodiment utilizes temperatures between about 100° C.. and about 163° C. In utilizing MEKOR, the present invention may permit the wash to be carried out at lower temperatures than without utilizing MEKOR, thereby permitting cost savings in the amount of time, energy and money required to heat the wash solution. Any effective temperature may be utilized. One of ordinary skill in the art would be able to determine an effective temperature of the caustic wash without undue experimentation once aware of the disclosure contained herein.

As discussed above, the addition of MEKOR to processes for removing precious metal(s) and, particularly, gold from activated carbon can decrease the amount of time required to remove a particular amount of precious metal(s) from the activated carbon. According to one example, the activated carbon is exposed to the caustic solution that includes MEKOR for a period of time of less than known processes that do not utilized MEKOR. Since, as described above, utilizing MEKOR can reduce the amount of time required to remove an amount of precious metal(s) from activated carbon, the present invention can save money by reducing the amount of time and, hence, the amount of heat and the energy and money required to generate the heat required for the hot caustic wash or strip. The period of time may vary, depending at least in part upon the desired amount of precious metals that are removed from the activated carbon or the percentage of the precious metal(s) in the activated carbon that it is desired to remove. One of ordinary skill in the art, once aware of the disclosure contained herein, could determine an appropriate amount of time for carrying out the process without undue experimentation.

As stated above, the amount of precious metal(s) in the activated carbon that is removed may vary. According to one example, the amount of gold removed from the activated carbon is greater than known processes that do not utilize MEKOR. Along these lines, the rate of precious metal removal utilizing the present invention may be greater as compared to known processes that do not utilize MEKOR. As with the composition of the solution that includes MEKOR as well as the other process parameters described above, the amount and rate of precious metal(s) removed from activated carbon according to the present invention may vary and one of ordinary skill in the art could control the amount and rate of precious metal(s) removed from activated carbon without undue experimentation once aware of the disclosure contained herein.

The following describes examples of laboratory experiments of compositions and processes according to the present invention. Table 1 includes results from 30 minute laboratory beaker tests. The tests were carried out on activated carbon utilized in a gold mining application. In these tests, about 5 grams of loaded carbon (activated carbon including gold) was introduced to prepared solutions of NaOH with and without MEKOR 70 at concentrations of about 0.5% and about 1.0%. The "blank" refers to an aqueous solution of 1% NaOH without MEKOR.

The solution and carbon were agitated for about 30 minutes at about 80° C. After agitation, the carbon was removed and rinsed with fresh water.

An assay was then carried out. The "stripped" carbon assay is an assay done to determine the amount of gold in the carbon after exposure to the solutions. According to the data in Table 1, a solution including about 1% MEKOR 70 was about 45% to about 50% better at removing gold than the blank.

TABLE 1

Laboratory Data

|  | Blank | 0.5% MEKOR | 1.0% MEKOR |
| --- | --- | --- | --- |
| Loaded carbon assay-gold ounces per ton | 192.95 | 192.95 | 192.95 |
| Stripped carbon assay-gold ounces per ton | 180.59 | 110.59 | 75.71 |
| Gold ounces removed | 12.36 | 82.36 | 117.24 |
| Percent gold removed | 6.41% | 42.69% | 86.86% |
| Gold strip time in hours | 0.5 | 0.5 | 0.5 |
| Gold ounces removed per hour | 24.72 | 164.72 | 234.48 |

Table 2, below, shows the ounces per ton of solution (OPT) for three actual plant strips, referred to as strips 1045, 1048 and 1049.

Strip 1045 was carried out utilizing a solution that included about 1% MEKOR. Strip 1045 was completed about 10.5 hours sooner than a blank while removing about 6% more gold from the carbon. Such a strip rate is more than about double the strip rate of the blank.

Strip 1048 was carried out utilizing a solution that included about 1% MEKOR. Strip 1048 was completed about 5.5 hours sooner that the blank, while removing more than about 11% more gold from the carbon. Such a strip rate is more than about three times the strip rate of the blank.

Strip 1049 was carried out with a caustic solution alone, without any MEKOR.

TABLE 2

Plant Gold Strip Data

|  | Test #1049 | Test #1045 | Test #1048 |
| --- | --- | --- | --- |
| Loaded carbon assay-gold ounces per ton | 28.32 | 30.3 | 62.36 |
| Stripped carbon assay-gold ounces per ton | 3.8 | 2.3 | 1.2 |
| Gold ounces removed | 24.52 | 28 | 61.16 |
| Percent gold removed | 86.86% | 92.41% | 98.07% |
| Gold strip time in hours | 22.5 | 12 | 17 |
| Gold ounces removed per hour | 1.09 | 2.33 | 3.60 |

The end of a strip typically is determined when the level of gold or other precious metal(s) in the stripping solution reaches a predetermined level or when the rate of removal from the activated carbon drops to a predetermined level.

Amounts of gold or other precious metal(s) in the activated carbon before and after the stripping processes may be determined by fire assay.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A process for removing precious metals from activated carbon, the process comprising:

contacting the activated carbon with an aqueous solution of methyl ethyl ketoxime and sodium hydroxide.

2. The process according to claim 1, wherein the solution comprises about 1% methyl ethyl ketoxime and about 1% sodium hydroxide.

3. The process according to claim 1, wherein the solution comprises about 0.5% to about 1.0% methyl ethyl ketoxime and about 1.0% to about 2.0% sodium hydroxide.

4. The process according to claim 1, wherein the solution comprises about 0.25% to about 2.0% methyl ethyl ketoxime and about 1% sodium hydroxide.

5. The process according to claim 1, further comprising:

contacting the activated carbon and solution of methyl ethyl ketoxime and sodium hydroxide at a temperature of about 90° C. to about 1000° C.

6. The process according to claim 1, wherein the precious metals comprise gold.

7. A process for recovering gold, the process comprising:
leaching gold from ore with a sodium cyanide solution;
contacting the sodium cyanide solution containing the gold with activated carbon; and
contacting the activated carbon with an aqueous solution of methyl ethyl ketoxime and sodium hydroxide.

8. The process according to claim 7, further comprising:
prior to contacting the activated carbon with the solution of methyl ethyl ketoxime and sodium hydroxide rinsing the activated carbon with an acidic solution and rinsing the activated carbon with water to neutralize the acidic solution; and
after contacting the activated carbon with the solution of methyl ethyl ketoxime and sodium hydroxide rinsing the activated carbon with water.

9. The process according to claim 7, wherein the solution comprises about 1% methyl ethyl ketoxime and about 1% sodium hydroxide.

10. The process according to claim 7, wherein the solution comprises about 0.5% to about 1.0% methyl ethyl ketoxime and about 1.0% to about 2.0% sodium hydroxide.

11. The process according to claim 7, wherein the solution comprises about 0.25% to about 2.0% methyl ethyl ketoxime and about 1% sodium hydroxide.

12. The process according to claim 7, further comprising:
contacting the activated carbon and solution of methyl ethyl ketoxime and sodium hydroxide at a temperature of about 90° C. to about 100° C.

13. A solution comprising about 0.25% to about 2.0% methyl ethyl ketoxime and about 1.0% to about 2.0% sodium hydroxide.

14. The solution according to claim 13, wherein the solution comprises about 1% methyl ethyl ketoxime and about 1% sodium hydroxide.

15. The solution according to claim 13, wherein the solution comprises about 0.5% to about 1.0% methyl ethyl ketoxime and about 1.0% to about 2.0% sodium hydroxide.

16. The solution according to claim 13, wherein the solution comprises about 0.25% to about 2.0% methyl ethyl ketoxime and about 1% sodium hydroxide.

* * * * *